US011994831B2

(12) United States Patent
Avril et al.

(10) Patent No.: US 11,994,831 B2
(45) Date of Patent: May 28, 2024

(54) WATCH CORRECTOR AND WATCH MIDDLE

(71) Applicant: MECO SA, Grenchen (CH)

(72) Inventors: Hervé Avril, Les Breuleux (CH); Ricardo Marcos, Worben (CH)

(73) Assignee: MECO SA, Grenchen (CH)

( * ) Notice: Subject to any disclaimer, the term of this patent is extended or adjusted under 35 U.S.C. 154(b) by 249 days.

(21) Appl. No.: 17/093,870

(22) Filed: Nov. 10, 2020

(65) Prior Publication Data

US 2021/0157268 A1 May 27, 2021

(30) Foreign Application Priority Data

Nov. 21, 2019 (EP) .................................... 19210563

(51) Int. Cl.
*G04B 3/02* (2006.01)
*G04G 5/04* (2006.01)
*G04G 17/02* (2006.01)

(52) U.S. Cl.
CPC ................ *G04B 3/02* (2013.01); *G04G 5/04* (2013.01); *G04G 17/02* (2013.01)

(58) Field of Classification Search
CPC .......... G04G 17/02; G04B 3/02; G04B 3/001; G04B 37/10; G04B 3/04
See application file for complete search history.

(56) References Cited

U.S. PATENT DOCUMENTS 3,032,651 A * 5/1962 Gisiger-Stahli ........ G04B 47/00 968/452
3,362,154 A * 1/1968 Perret .................. G04B 37/106 368/290
6,087,605 A * 7/2000 Heidenfels ............ H01H 13/14 200/341
6,373,467 B1 * 4/2002 Slowinski .......... G06F 3/03543 345/158
7,192,182 B2 * 3/2007 Hiranuma ........... G04B 37/103 368/308
2004/0257917 A1 * 12/2004 Yoshikawa ........... G04B 37/10 368/318

(Continued)

FOREIGN PATENT DOCUMENTS

CN 109765776 A 5/2019
EP 3 407 144 A2 11/2018

(Continued)

OTHER PUBLICATIONS

Office Action dated Sep. 21, 2021 in Japanese Application No. 2020-188484.

(Continued)

*Primary Examiner* — Sean Kayes
(74) *Attorney, Agent, or Firm* — Sughrue Mion, PLLC

(57) ABSTRACT

A watch corrector (100) including at least one case (110) and at least one mobile element (120). In order to avoid a movement according to a degree of freedom, the at least one mobile element (120) is inserted by force, preferably, the at least one mobile element (120) includes at least one second immobilisation member (125) configured to immobilise the at least one mobile element (120) in the at least one case (110), and the at least one case (110) is inserted by force, preferably, the at least one case (110) includes at least one first immobilisation member (115) being configured to immobilise the at least one case (110) in the watch middle (200).

18 Claims, 1 Drawing Sheet

(56) References Cited

U.S. PATENT DOCUMENTS

| | | | | |
|---|---|---|---|---|
| 2005/0013202 A1* | 1/2005 | Hiranuma | G04B 37/103 | 368/206 |
| 2005/0013203 A1* | 1/2005 | Hiranuma | G04B 37/10 | 368/206 |
| 2005/0088920 A1* | 4/2005 | Hiranuma | G04B 37/103 | 368/319 |
| 2005/0094498 A1* | 5/2005 | Koshoji | G04B 3/043 | 368/319 |
| 2006/0158967 A1* | 7/2006 | Hiranuma | G04B 3/043 | 368/318 |
| 2007/0076532 A1* | 4/2007 | Hiranuma | G04B 37/10 | 368/319 |
| 2009/0003142 A1* | 1/2009 | Hiranuma | G04B 37/106 | 29/896.34 |
| 2011/0249378 A1* | 10/2011 | Yoo | G04G 21/00 | 361/679.01 |
| 2012/0263023 A1* | 10/2012 | Koshoji | G04C 3/001 | 368/308 |
| 2013/0155821 A1* | 6/2013 | Tsuji | G04B 37/081 | 368/308 |
| 2013/0215724 A1* | 8/2013 | Hiranuma | G04B 3/046 | 200/325 |
| 2014/0286146 A1* | 9/2014 | Sakurazawa | G04B 3/043 | 368/320 |

FOREIGN PATENT DOCUMENTS

| | | | |
|---|---|---|---|
| EP | 3 483 661 | A1 | 5/2019 |
| FR | 954 396 | A | 12/1949 |
| JP | 55-16473 | U | 2/1980 |
| JP | 55-127327 | U | 9/1980 |
| JP | 56-1188 | U | 1/1981 |
| JP | 56-32628 | A | 4/1981 |

OTHER PUBLICATIONS

Communication dated Sep. 28, 2021 from the China National Intellectual Property Administration in Chinese Application No. 202011317119.3.

European Search Report for corresponding EP 19 21 0563, dated Apr. 30, 2020.

* cited by examiner

WATCH CORRECTOR AND WATCH MIDDLE

CROSS REFERENCE TO RELATED APPLICATIONS

This application claims priority to European Patent Application No. 19210563.3 filed Nov. 21, 2019, the entire contents of which are incorporated herein by reference.

TECHNICAL FIELD

The present invention relates to a watch corrector and a middle in which it is inserted.

TECHNOLOGICAL BACKGROUND

Certain watches, in particular so-called highly complex watches, offer to their users a number of functions that is so high that it is not possible to correct them all using one single rewinding and correction crown. For this reason, such watches comprise additional control means such as correctors. There are correctors of different types among which miniature correctors are found that are usually actuated by means of a sharp instrument.

These miniature correctors conventionally comprise a socket driven, glued or screwed in an opening made in the middle of the watch, and a cylindrical control shaft capable of sliding freely into the socket. The socket comprises, on the outer side of the watch case, a first cylindrical passage adapted to the dimensions of a first portion of the control shaft, and on the inner side of the watch case, a second cylindrical passage arranged in the extension of the first cylindrical passage and of which the inner diameter, adapted to the dimensions of a second portion of the control shaft, is less than that of the first cylindrical passage. A sealing lining housed in a groove arranged on a perimeter of the first portion of the control shaft makes it possible to guarantee the sealing between the control shaft and the socket. Such a pushbutton also comprises a helical spring which is compressed when the user presses the miniature pushbutton, and of which the return force returns the control shaft into the rest position when the use releases the pressure on the pushbutton.

However, these correctors of the type described above project from the middle and risk damaging shirt sleeves or delicate fabrics.

SUMMARY OF THE INVENTION

The present invention resolves all or some of these disadvantages using a watch corrector configured to be inserted in a watch middle; said watch middle includes a primary contour, in particular of a left-hand shape, preferably of a left-hand curve; said watch corrector comprising at least one:

- Case; said at least one case comprises at least one first surface and being configured to be inserted, preferably by force, in said watch middle; said at least one first surface representing a first portion of said primary contour, in particular of a left-hand shape, preferably of a left-hand curve and being configured to follow said primary contour, in particular of a left-hand shape, preferably of a left-hand curve of said watch middle, preferably, said at least one first surface being configured to be combined with said primary contour, in particular of a left-hand shape, preferably of a left-hand curve of said watch middle when said at least one case is inserted in said middle of said watch;
- Mobile element; said at least one mobile element being configured to be inserted, preferably by force, in said at least one case, preferably to be mobile in said at least one case and comprising at least one second surface representing a second portion of said primary contour, in particular of a left-hand shape, preferably of a left-hand curve and being configured to follow said primary contour, in particular of a left-hand shape, preferably of a left-hand curve of said watch middle, and/or of said at least one first surface of said at least one case, preferably, said at least one second surface being configured to be combined with said primary contour, in particular of a left-hand shape, preferably of a left-hand curve of said watch middle, and/or of said at least one first surface of said at least one case when said at least one case is inserted in said middle of said watch.

Thanks to this arrangement, the corrector is combined with the contour of the middle of the watch and does not project. Consequently, the corrector according to the invention does not risk damaging shirt sleeves or delicate fabrics and is oriented with respect to the middle, preferably to the primary contour, in particular of a left-hand shape, preferably of a left-hand curve.

According to an embodiment, said at least one case comprises at least one first immobilisation member; said at least one first immobilisation member being configured to immobilise said at least one case in at least one degree of freedom when said at least one case is inserted in said watch middle.

Thanks to this arrangement, the corrector is immobilised in the middle and does not project.

According to an embodiment, said at least one case includes a first side surface and said at least one first immobilisation member forms a first relief on said first side surface, preferably a first projection and/or a first depression on said first side surface.

Thanks to this arrangement, the corrector is immobilised in the middle and does not project.

According to an embodiment, said at least one mobile element comprises at least one second immobilisation member; said at least one second immobilisation member being configured to immobilise said at least one mobile element in at least one degree of freedom when said at least one mobile element is inserted in said at least one case.

Thanks to this arrangement, said at least one mobile element is immobilised in said at least one case and does not project.

According to an embodiment, said at least one mobile element includes a second side surface and said at least one second immobilisation member forms a second relief on said second side surface, preferably a second projection and/or a second depression on said second side surface.

Thanks to this arrangement, said at least one mobile element is immobilised in said at least one case and does not project.

The present invention resolves all or some of these disadvantages using a watch middle comprising an opening and said watch corrector according to the invention; said opening being configured to enable the insertion of said watch corrector such that said at least one second surface is combined with said primary contour, in particular of a left-hand shape, preferably of a left-hand curve of said watch middle and/or of said at least one first surface of said at least one case when said at least one case is inserted in said middle of said watch.

Thanks to this arrangement, the middle of the watch does not include any projection. Consequently, the middle of the watch does not risk damaging shirt sleeves or delicate fabrics and is oriented with respect to the middle, preferably primary contour, in particular of a left-hand shape, preferably of a left-hand curve.

According to an embodiment, said opening comprises a shape of a main relief, preferably a main projection and/or a main depression so as to receive said watch corrector according to an embodiment.

Thanks to this arrangement, said at least one case can be inserted in said middle of said watch.

BRIEF DESCRIPTION OF THE FIGURES

The invention will be described below in more detail using the appended drawings, given as examples which are not at all limiting, wherein.

DETAILED DESCRIPTION OF THE INVENTION

Figure 1:
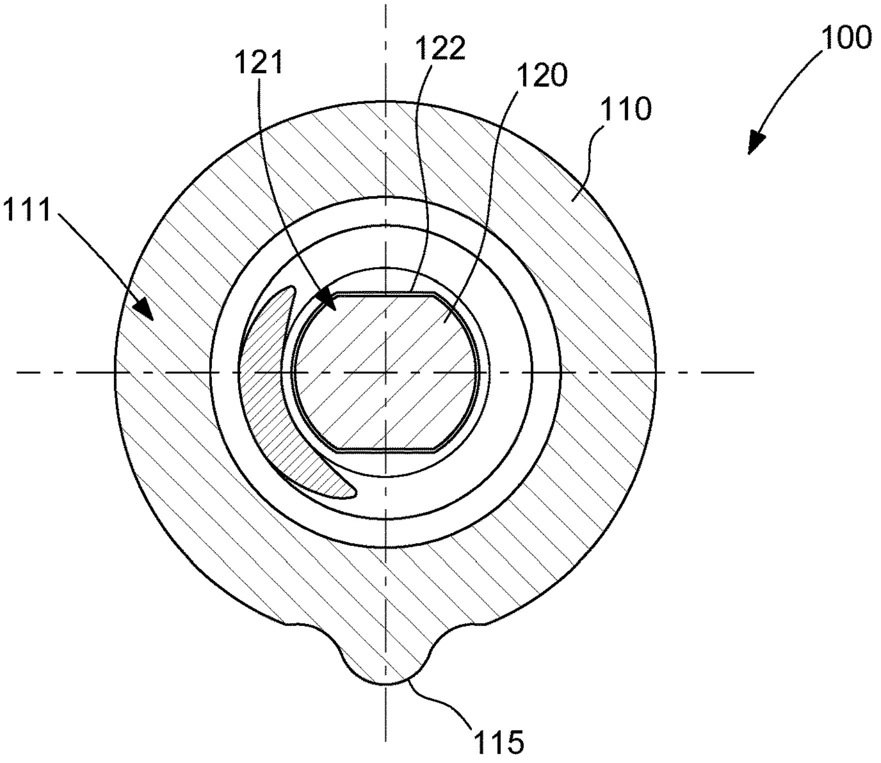
FIG. 1 presents a top view of said watch corrector 100 according to the invention; and, FIG. 2 illustrates an example of a watch corrector 100 according to the invention.

The present invention relates to a watch middle 200 with no projection and more accurately, a watch corrector 100 which follows the contours of the watch middle 200 so as to not project from the primary contour, in particular of a left-hand shape, preferably of a left-hand curve of said watch middle 200 and therefore damage shirt sleeves or delicate fabrics and is oriented with respect to the middle, preferably primary contour, in particular of a left-hand shape, preferably of a left-hand curve.

Indeed, said watch corrector 100 comprises at least one case 110 and at least one mobile element 120 which are both configured to follow the primary contour, in particular of a left-hand shape, preferably of a left-hand curve of said watch middle 200.

To do this, said at least one case 110 is configured to be inserted in said watch middle 200 and comprises at least one first surface 111, preferably of a left-hand shape, representing a first portion of said primary contour, in particular of a left-hand shape, preferably of a left-hand curve and being configured to follow said primary contour, in particular of a left-hand shape, preferably of a left-hand curve of said watch middle 200.

Preferably, said at least one first surface 111 is configured to be combined with said primary contour, in particular of a left-hand shape, preferably of a left-hand curve of said watch middle 200 when said at least one case 110 is inserted in said middle of said watch 200;

More specifically, said at least one case 110 can be inserted in said watch middle 200 by force or comprises at least one first immobilisation member 115 configured to immobilise said at least one case 110 in at least one degree of freedom when said at least one case 110 is inserted in said watch middle 200. Indeed, one of the advantages of this invention is to integrate or drive a corrector of a left-hand shape in a watch of a left-hand shape.

Figure 2:
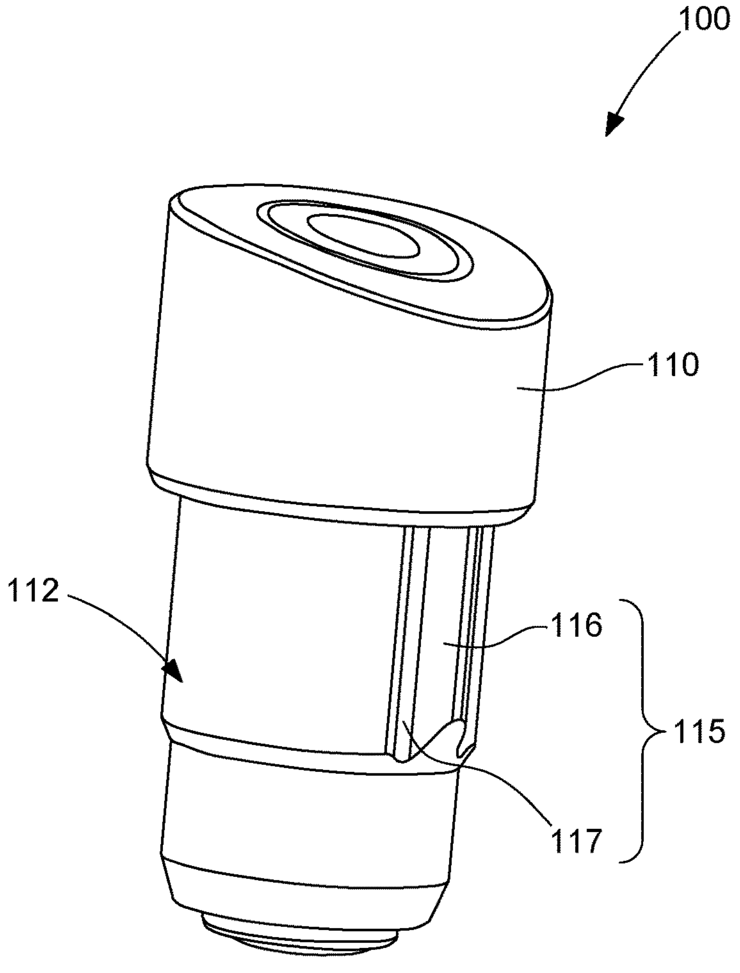

Actually, said at least one case 110 includes a first side surface 112 and said at least one first immobilisation member 115 forms a first relief on said first side surface 112, preferably a first projection 116 and/or a first depression 117 on said first side surface 112 as can be seen in FIGS. 1 and 2.

Moreover, said at least one first surface 111 represents a first portion of said primary contour, in particular of a left-hand shape, preferably of a left-hand curve and is configured to follow said primary contour, in particular of a left-hand shape, preferably of a left-hand curve of said watch middle 200, preferably, said at least one first surface 111 being configured to be combined with said primary contour, in particular of a left-hand shape, preferably of a left-hand curve of said watch middle 200 when said at least one case 110 is inserted in said middle of said watch 200 such that the corrector is combined with the contour of the middle of the watch and does not project.

As to said at least one mobile element 120, it is configured to be inserted in said at least one case 110.

However, the latter, i.e. said at least one mobile element 120, can be mobile in said at least one case 110 and comprises at least one second surface 121 representing a second portion of said primary contour, in particular of a left-hand shape, preferably of a left-hand curve and is configured to follow said primary contour, in particular of a left-hand shape, preferably of a left-hand curve of said watch middle 200, and/or said at least one first surface 111 of said at least one case 110.

Preferably, said at least one second surface 121 is configured to be combined with said primary contour, in particular of a left-hand shape, preferably of a left-hand curve of said watch middle 200 and/or of said at least one first surface 111 of said at least one case 110 when said at least one case 110 is inserted in said middle of said watch 200.

Although mobile in said at least one case 110, said at least one mobile element 120 comprises at least one second immobilisation member 125 configured to immobilise said at least one mobile element 120 in at least one degree of freedom when said at least one mobile element 120 is inserted in said at least one case 110.

Indeed, said at least one mobile element 120 includes a second side surface 122 and said at least one second immobilisation member 125 forms a second relief on said second side surface 122, preferably a second projection 126 and/or a second depression 127 on said second side surface 122.

Indeed, once said at least one mobile element 120 inserted in said at least one case 110, the assembly, i.e. said watch corrector 100 according to the invention, is introduced in an opening, that said watch middle 200 includes, such that said at least one second surface 121 of said watch corrector 100 is combined with said primary contour, in particular of a left-hand shape, preferably of a left-hand curve of said watch middle 200 and/or of said at least one first surface 111 of said at least one case 110 of said watch corrector 100.

In order to immobilise said watch corrector 100 in said watch middle 200, said opening comprises a shape of a main relief, preferably a main projection and/or a main depression so as to receive said watch corrector 100. Of course, said main relief, preferably said main projection and/or said main depression is complementary of said first relief on said first side surface 112, preferably of said first projection 116 and/or said first depression 117.

The invention claimed is:

1. A watch corrector configured to be inserted in a watch middle, said watch corrector comprising:

a case, said case comprises a first surface, said case being configured to be inserted into said watch middle, said first surface representing a first portion of a primary contour; and a mobile element, said mobile element inserted in said case and configured to be mobile in said case, wherein said mobile element comprises a second surface representing a second portion of said primary contour, wherein, along a longitudinal axis of the case, said primary contour comprises a left-hand curve shape of which a first portion of a perimeter of the first surface is differently positioned along the longitudinal axis than is a second portion of the perimeter, wherein the longitudinal axis is from a first end of the case and to the second end of the case, wherein the first end of the case is configured to be inserted into the watch middle, wherein the second end of the case is, along the longitudinal axis, opposite to the first end and comprises the first surface, wherein the perimeter is an outer boundary of the first surface along a radial axis of the case, wherein the radial axis is perpendicular to the longitudinal axis, and wherein said primary contour is formed on the first surface of the case and on the second surface of the mobile element.

2. The watch corrector according to claim 1, wherein said case comprises first immobilisation member; said first immobilisation member being configured to immobilise said case in at least one degree of freedom when said case is inserted in said watch middle.

3. The watch corrector according to claim 2, wherein said first immobilisation member comprises at least one of a first projection or a first depression on said first side surface.

4. The watch corrector of claim 2, wherein said first immobilisation member comprises a first projection, and wherein said first projection extends in a longitudinal direction along said first side surface.

5. The watch corrector of claim 4, wherein said first side surface is generally smooth.

6. The watch corrector of claim 2, wherein said first immobilisation member comprises a first projection and a first depression on said first side surface, wherein said first projection extends in a longitudinal direction along said first side surface, wherein said first depression extends adjacent to and alongside of said first projection, and wherein said first side surface is generally smooth.

7. The watch corrector of claim 6, wherein the primary contour is generally smooth.

8. The watch corrector according to claim 1, wherein said case includes a first side surface and a first relief on said first side surface.

9. The watch corrector according to claim 1, wherein said mobile element is configured to immobilise said mobile element in at least one degree of freedom when said mobile element is inserted in said case.

10. The watch corrector according to claim 1, wherein said mobile element includes a second side surface and said second immobilisation member forms a second relief on said second side surface, wherein the second relief comprises a second projection and a second depression on said second side surface).

11. The watch corrector of claim 1, wherein the primary contour is generally smooth.

12. The watch corrector according to claim 1, the first surface of the case and the second surface of the mobile element are aligned along said primary contour.

13. A watch comprising:

a watch middle; and a watch corrector, wherein the watch middle comprises an opening, wherein the watch corrector comprises a primary contour, wherein the watch corrector comprises a case, wherein said case comprises a first surface, said first surface representing a first portion of the primary contour, wherein a mobile element, said mobile element inserted in said case and configured to be mobile in said case, wherein said mobile element comprising a second surface representing a second portion of said primary contour, wherein, along a longitudinal axis of the case, said primary contour comprises a left-hand curve shape of which a first portion of a perimeter of the first surface is differently positioned along the longitudinal axis than is a second portion of the perimeter, wherein the longitudinal axis is from a first end of the case and to the second end of the case, wherein the first end of the case is configured to be inserted into the watch middle, wherein the second end of the case is, along the longitudinal axis, opposite to the first end and comprises the first surface, wherein the perimeter is an outer boundary of the first surface along a radial axis of the case, wherein the radial axis is perpendicular to the longitudinal axis, wherein said primary contour is formed on the first surface of the case and on the second surface of the mobile element, and wherein the watch corrector is inserted into the opening of the watch middle.

14. The watch of claim 13, wherein the watch corrector follows the contours of the watch middle whereby the watch corrector does not project from the primary contour.

15. The watch of claim 13, wherein the primary contour is generally smooth.

16. The watch of claim 13, wherein said case comprises a first immobilisation member, said first immobilisation member being configured to immobilise said case in at least one degree of freedom when said case is inserted in said watch middle, wherein said first immobilization member comprises a first projection and a first depression on said first side surface, wherein said first projection extends in a longitudinal direction along said first side surface, wherein said first depression extends adjacent to and alongside of said first projection, and wherein said first side surface is generally smooth.

17. A watch corrector, comprising:

a case; and a mobile element inserted into the case and mobile with respect to the case, wherein the case comprises a first surface at a top surface of the corrector, wherein the mobile element comprises a second surface at the top surface of the corrector, wherein the first surface and the second surface form a primary contour on the first surface of the case and on the second surface of the mobile element, and wherein, along a longitudinal axis of the case, the primary contour has a generally smooth shape of which a first portion of a perimeter of the first surface is differently positioned along the longitudinal axis than is a second portion of the perimeter, wherein the longitudinal axis is from a first end of the case and to the second end of the case, wherein the first end of the case is configured to be inserted into a watch middle, wherein the second end of the case is, along the longitudinal axis, opposite to the first end and comprises the first surface, wherein the perimeter is an outer boundary of the first surface along a radial axis of the case, wherein the radial axis is perpendicular to the longitudinal axis.

18. The watch corrector of claim 17, wherein the primary contour comprises a left-hand curve shape.

* * * * *